Jan. 6. 1925.
W. P. BROCKSCHMIDT
LAWN SPRAYER
Filed Nov. 21, 1921
1,521,863
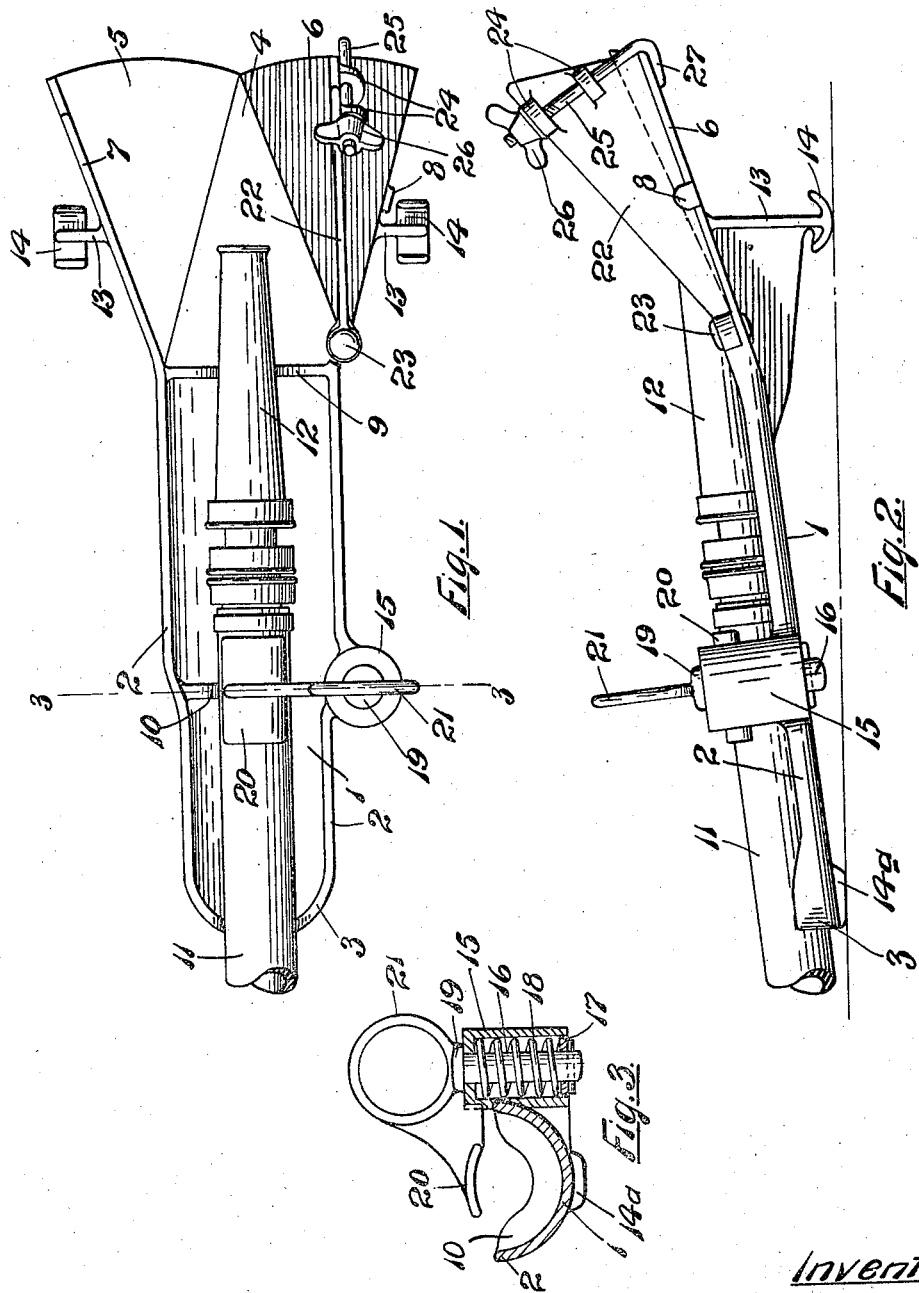
Inventor
Walter P. Brockschmidt
By Frank E. Liverance, Jr.
Attorney Patented Jan. 6, 1925.

1,521,863

UNITED STATES PATENT OFFICE.

WALTER P. BROCKSCHMIDT, OF MUSKEGON HEIGHTS, MICHIGAN.

LAWN SPRAYER.

Application filed November 21, 1921. Serial No. 516,558.

*To all whom it may concern:*

Be it known that I, WALTER P. BROCKSCHMIDT, a citizen of the United States of America, residing at Muskegon Heights, in the county of Muskegon and State of Michigan, have invented certain new and useful Improvements in Lawn Sprayers; and I do hereby declare the following to be a full, clear, and exact description of the invention, such as will enable others skilled in the art to which it appertains to make and use the same.

This invention relates to a lawn sprinkler, being particularly concerned with a novel construction of holder for the nozzle and adjacent portion of the hose to which the nozzle is attached, said holder being so formed that the water coming from the end of the nozzle is spread out into a more or less finely divided spray which drops on the lawn from a point directly in front of the holder out to the farthest limits that the force of the pressure of the water carries the same, and substantially evenly over the entire surface between. It is a primary object and purpose of the present invention to construct a holder of this character capable of attaining the above stated end. A further object of the invention is to construct the holder so that the spray of water may be controlled as to its lateral extent of projection by a simple adjustment of one part of the holder, whereby it is possible to water a lawn at its side edges practically on a line with such edges and without wasting a considerable portion of the water by watering beyond, this being particularly valuable in watering lots at the boundaries thereof, or along side walks. A still further object of the invention is to construct a holder for the hose and nozzle therefor and provide it with means for the ready attachment of the hose when it is to be used, said attaching means being very simple yet effective in construction. These and various other objects and purposes will appear as understanding of the invention is had from the following description, taken in connection with the accompanying drawing, in which, Fig. 1 is a plan view of the lawn sprinkler, the hose being attached thereto.

Fig. 2 is a side elevation thereof, and

Fig. 3 is a transverse section on the plane of line 3—3, of Fig. 1.

Like reference characters refer to like parts in the different figures of the drawing.

In the construction of the lawn sprinkler, a relatively narrow and elongated sheet metal member 1 is used having upwardly extending flanges 2 at each side, connecting at the rear ends thereof by a curved flange 3, as shown. Integral with said member 1 at its front end is a spreader portion consisting of a middle section 4 and two side sections 5 and 6, substantially triangular in shape, the middle section narrowing progressively from its base where it joins the front end of member 1 to a point at its outer end, while the side sections 5 and 6 are widest at their outer ends and narrow progressively to points at their inner ends. The middle section extends upwardly and outwardly at an angle to the horizontal from member 1, and the side sections slope downwardly and outwardly laterally at an angle to the middle section. The section 5 at its side edge is provided with an upwardly extending flange 7, as a continuation of the side flange 2, being of greater depth than said flange 2 and having its greatest depth at the outer portion thereof. The section 6 does not have such side flange but is provided with an integral upwardly extending lug 8, the purpose of which will hereafter appear.

Cross ribs 9 and 10 are made across the upper side of the member 1 at its front end and between its ends, both of these ribs, as well as the curved end flange 3 having recess in their upper edges to serve as seats for reception of the hose 11 and a nozzle 12 connected therewith, lying lengthwise of the member 1. Substantially midway between the ends of the sections 4, 5 and 6, a web 13 projects downwardly, at each end at its lower edges being provided with curved supporting feet 14, as shown. The rear end of the member 1 is also formed with a downwardly projecting foot support 14ᵃ. The device, accordingly, has a three point support on the ground on which it is placed thereby obviating slight irregularities in the ground surface and being easily moved over the ground whenever desired.

At one side of the member 1 and adjacent the intermediate cross rib 10, a boss 15 is provided with a recess or opening in its under side. A rod 16 passes loosely through the boss downwardly into this recess and has a washer 17 connected near its lower end and held by a cotter pin. Between the washer and the upper side of the recess a coiled compression spring 18 is located, the tendency of which is to move the rod downwardly. A head 19 is formed at the upper end of the rod 16, from which a finger extends laterally terminating in a shoe 20 adapted to bear against the upper side of the hose 11 when it is placed in position. A finger engaging eye 21 is also formed above head 19 for manual operation of the hose securing member, it being evident that by grasping this eye, the rod 16 and attached shoe 20 may be lifted for the release or the introduction of the hose, or for adjustment thereof to a different position, the hose being securely held by pressure of the shoe 20 as soon as the hose securing member is released for that purpose.

A wing 22 is pivotally connected at 23 so as to swing over the section 6. The wing on its outer side is provided with two outwardly projecting lugs 24 through which a rod 25 loosely passes, its upper end being threaded to receive a wing nut 26. The lower portion of the rod is bent backwardly at right angles substantially, to make a hook 27 passing under said section 6. It is evident that wing 22 may be adjusted to different positions and held in any desired position by tightening the nut 26 against the upper lug 24, thereby drawing the hook 27 against the under side of section 6. In its extreme outer position, the wing is stopped by engagement against the lug 8.

This construction is very effective in practical use. The water coming from the end of nozzle 12 strikes against the inclined upper side of section 4 and therefrom is directed over the upper sides of sections 5 and 6, flattening out and spreading out into a substantially flat spray which falls on the ground in front of the holder and for a distance out, dependent upon the water pressure forcing the water from the nozzle.

The wing 22 governs the extent of the side watering of the lawn at one side, it being evident that it may be set in any one of a large number of positions, so that the line of watering at such side may be controlled within very close limits. This is very desirable at the edges of lawns, along sidewalks and the like. It is not necessary to shut off the water at any time when a change of position is to be made of the device, it being merely necessary to lift the holder and move it back or to one side to a new position. It is also evident that a change of the device to a new position does not necessitate one walking over the portion of the lawn sprinkled, no walking in wet grass being necessary.

The construction in practice has proved exceptionally satisfactory, the water being dispensed evenly over the lawn in front of the device, and the full volume of the water being passed from the end of the nozzle without restriction such as is commonly required to change a full stream of water into a spray. The construction is simple and is readily and cheaply manufactured. Many variations in the specific minor detail of construction are possible, and I do not wish to be limited to the exact specific constructive detail shown, but consider that the invention comprehends all constructions coming within the scope of the appended claims defining the invention.

I claim:

1. In a device of the class described, a base plate of narrow elongated form provided at its front end with a portion extending forwardly and upwardly at an angle and wider at its front end than where it joins with the base plate, ribs located across the plate and extending upwardly therefrom, said ribs having recesses in the upper side thereof, a boss having a recess in its under side projecting to one side of the plate, a rod passing downwardly through the boss, a spring around the rod within said recess, a washer on the rod under the spring, and a head including a laterally projecting finger extending across the plate secured to the upper end of the rod, substantially as described.

2. A device of the class described, comprising a relatively narrow and elongated base plate provided at one end with an upwardly and outwardly extending portion wider at its outer end than where it connects with the plate and including a central triangular section narrowest at the front and two outwardly and downwardly sloping triangular sections at the sides of the central section widest at their front ends, means to detachably secure a hose and nozzle lengthwise of the plate to direct water from the nozzle on to the upper side of said outwardly extending portion, a vane pivotally mounted at its inner end to said outwardly extending portion and adapted to swing over one of said side sections, and means for releasably securing the vane in any position to which it may be moved.

3. A device of the character described, comprising a relatively narrow elongated base plate provided at its front end with a portion extending forwardly and upwardly at an angle to the base, an upwardly extending flange at one side of said forwardly extending portion, a wing pivotally mounted at its inner end at the opposite side of said portion to swing thereover, and a device mounted at the outer end of the wing and adapted to engage under the outer edge of said forwardly projecting portion to hold the wing in any one of a number of positions.

4. A device of the class described, comprising a relatively narrow elongated base plate provided at its front end with a portion extending forwardly and upwardly at an angle to the base, an upwardly extending flange at one side of said forwardly extending portion, a wing pivotally mounted at its inner end at the opposite side of said portion to swing thereover, a rod mounted at the free end of the wing and having one end bent to pass under the outer edge portion of said forwardly projecting portion, and means on the rod and on the wing for drawing said bent end of the rod against the under side of said forwardly projecting portion to thereby hold the wing against movement, substantially as described.

In testimony whereof I affix my signature.

WALTER P. BROCKSCHMIDT.